United States Patent

[11] 3,550,724

| [72] | Inventor | George W. Vollmer |
| | | Chardon, Ohio |
| [21] | Appl. No. | 780,329 |
| [22] | Filed | Dec. 2, 1968 |
| [45] | Patented | Dec. 29, 1970 |
| [73] | Assignee | Eaton Yale & Towne Inc. |
| | | Cleveland, Ohio |
| | | a corporation of Ohio |

[54] PRESSURE LUBRICATION SYSTEM FOR GEARED DRIVE MECHANISM
22 Claims, 9 Drawing Figs.

[52] U.S. Cl. .................................................. 184/6,
74/711; 184/11
[51] Int. Cl. ....................................................... F01m 1/08
[50] Field of Search ........................................... 184/6, 6U,
11; 74/467, 468, 711, 710

[56] References Cited
UNITED STATES PATENTS

| 2,840,186 | 6/1958 | Nyland ........................ | 184/6 |
| 2,842,226 | 7/1958 | Liebel ......................... | 184/6 |
| 3,040,600 | 6/1962 | Mueller ....................... | 74/711 |
| 3,053,115 | 9/1962 | Cartwright et al. ........... | 184/6X |
| 3,065,822 | 11/1962 | McAfee et al. .............. | 184/6 |
| 3,259,210 | 7/1966 | Beebe et al. ................. | 184/6 |
| 3,441,106 | 4/1969 | Taylor et al. ................. | 184/11X |

FOREIGN PATENTS

| 1,047,820 | 12/1958 | Germany ..................... | 184/6 |

Primary Examiner—Manuel A. Antonakas
Attorney—Woodhams, Blanchard and Flynn

ABSTRACT: A geared drive mechanism having a pressurized lubrication system for lubricating a differential gear mechanism. A pump provides for flow of lubricant from a reservoir to a discharge nozzle located adjacent the differential gear mechanism. The differential gear mechanism includes an annular housing having a plurality of openings therein which move past the nozzle as the housing rotates. Lubricant ejected from the nozzle passes through the openings into contact with the differential gears and the differential spider whereby the lubricant then flows outwardly of the spider arms to lubricate the bearings rotatably supporting the differential gears. The pressurized lubricant can also be supplied through suitable passageways to other bearing and friction points within the geared drive mechanism.

INVENTOR.
GEORGE W. VOLLMER

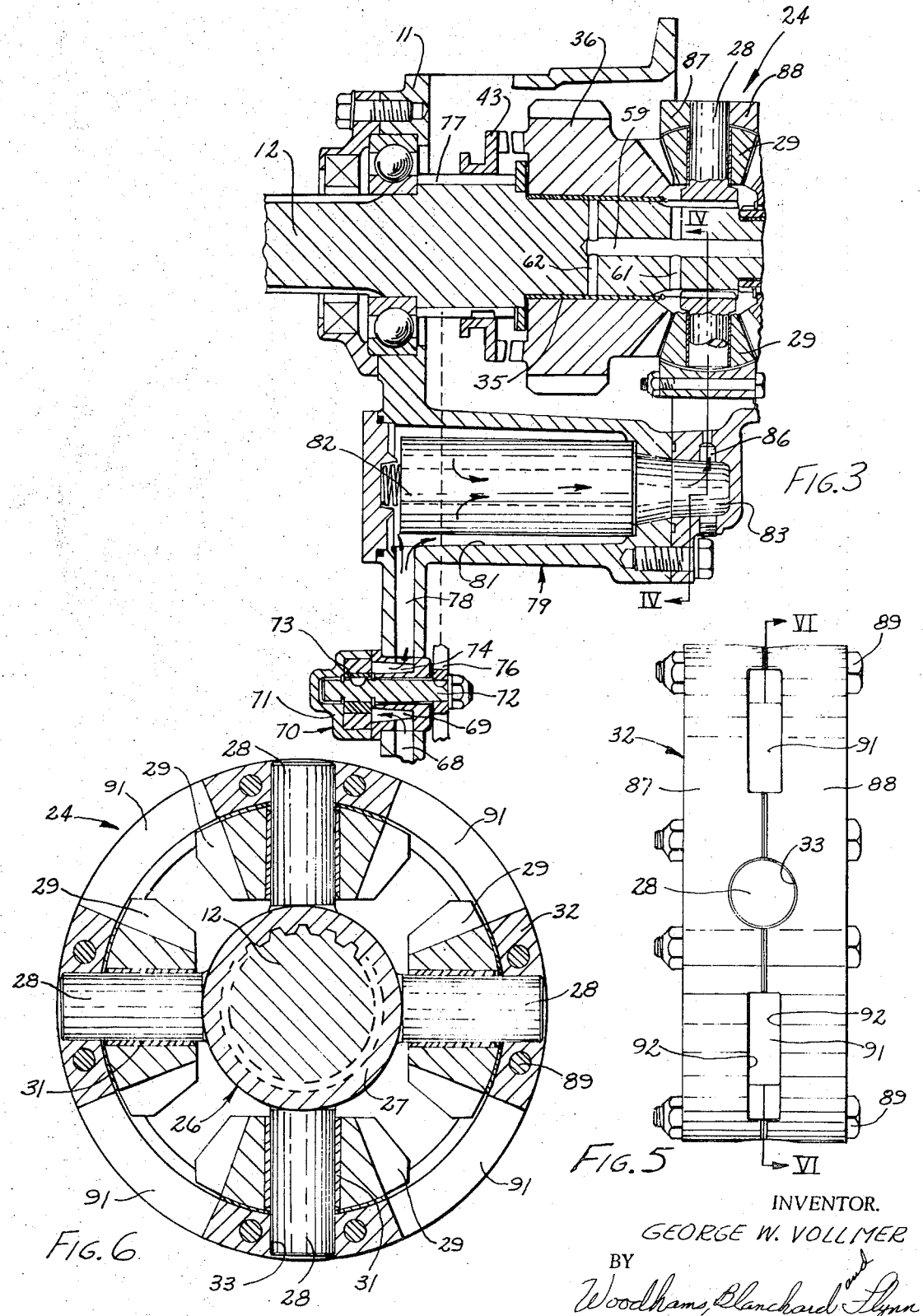

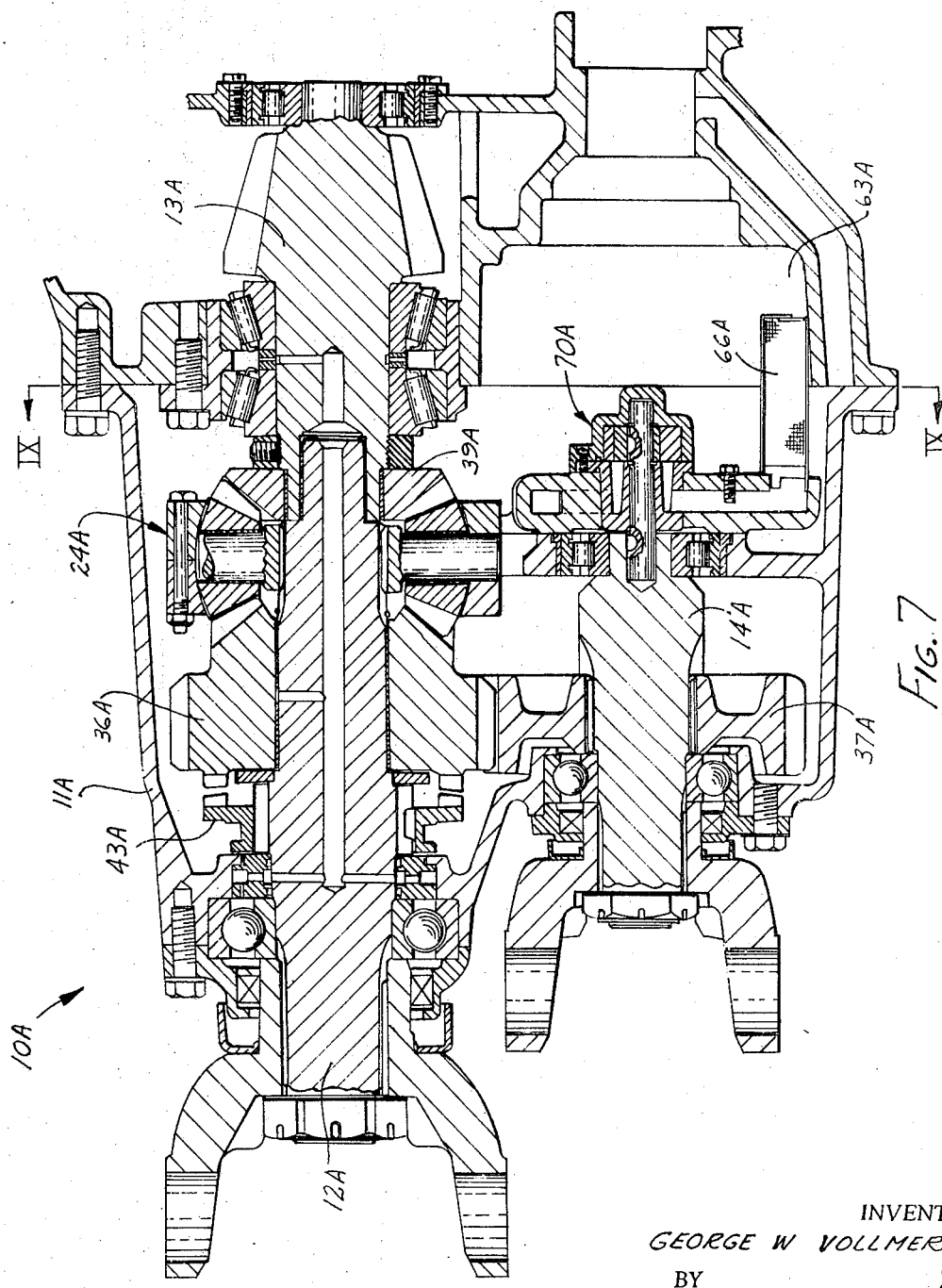

3,550,724

PRESSURE LUBRICATION SYSTEM FOR GEARED DRIVE MECHANISM

FIELD OF THE INVENTION

This invention relates to an improved lubrication system for a geared drive mechanism and, in particular, to a system for providing positive lubrication of a differential gear unit, as in an interaxle differential structure, under high speed operating conditions.

BACKGROUND OF THE INVENTION

Geared drive mechanisms, such as multispeed axle drives, are normally lubricated during operation by means of a splash lubrication system. In these systems, the gear drive mechanism is normally provided with a lubricant sump with one or more gears of the drive train being positioned so that at least a portion of the gears extend into the lubricant contained in the sump whereby the gears pick up and carry therewith limited quantities of lubricant as the gears rotatably travel therethrough. Lubricant is thus supplied to the various gears of the drive mechanism due to the meshing relationship which exists therebetween. Rotation of the gears also causes some of the lubricant to be thrown from the gears whereupon same is then supplied to other desired lubrication points, specifically support bearings.

While lubrication by means of a splash system is satisfactory in many situations, the design of an adequate splash lubrication system for a geared drive mechanism is complicated by the numerous walls and webs provided for supporting the numerous gears and related rotatable elements which are present within such mechanism. Further, at high speeds the lubricant tends to be rapidly thrown from the rotating gears and, since high speed operation of gears should be accompanied by an increased supply of lubricant, this results in increased wear of the gears and accordingly reduced life of the drive mechanism.

A further fault encountered with splash lubrication systems is that the lubricant thrown from the gears is not consistently directed to the desired regions or bearing points. For example, under low speed operating conditions, the slow rotational speeds of the gears will cause the lubricant to be thrown or transferred therefrom in a first direction, whereas when the gears are rotated at high speeds, the high centrifugal force will cause the lubricant to be thrown therefrom much more rapidly and accordingly the lubricant will be thrown from the gears in a direction different from the first direction. Thus, many of the desired lubrication points in the gear drive mechanism are not adequately supplied with lubricant under all operating conditions. This greatly increases the wear of the various components of the geared drive mechanism and accordingly reduces the useful life thereof.

Accordingly, it is an object of this invention to provide an improved lubrication system for a geared drive mechanism and, specifically:

1. To provide a positive pressure lubrication system for supplying lubricant to desired lubrication points within the geared drive mechanism.

2. To provide a lubrication system, as aforesaid, including a pump for imposing a positive pressure on the lubricant to insure that same will be supplied to the desired lubrication points under all operating conditions.

3. To provide a lubrication system, as aforesaid, for a differential gear mechanism whereby same will be positively lubricated, especially during high speed operation.

4. To provide a lubrication system, as aforesaid, wherein a plurality of passages are provided between a lubricant sump and the differential gear mechanism, lubricant being caused to flow through the passageways by means of a positively driven pump.

5. To provide a lubrication system, as aforesaid, wherein a spray nozzle is located directly adjacent the rotating housing of the differential gear mechanism.

6. To provide a lubrication system, as aforesaid, wherein the differential gear housing is provided with a plurality of openings therein which are rotated past the spray nozzle whereby lubricant ejected from the nozzle passes through the openings to lubricate the differential gears and the support bearings therefor.

7. To provide a lubrication system, as aforesaid, including further passageways in communication with the discharge side of the pump for positively supplying lubricant to other desired lubrication points within the geared drive mechanism.

8. To provide a lubrication system, as aforesaid, wherein the lubricant pump is rotatably driven by a shaft of the geared drive mechanism.

9. To provide a lubrication system, as aforesaid, specifically suitable for use in a multispeed axle structure used for dividing the power flow between a pair of axles, such as a tandem-axle or a four-wheel drive.

10. To provide a lubrication system, as aforesaid, which results in substantially increased life of the gears and related components of the geared drive mechanism by providing adequate lubrication under all operating conditions.

11. To provide a lubrication system, as aforesaid, which is simple in operation and substantially free of maintenance.

Other objects and purposes of this invention will be apparent to persons acquainted with devices of this general type upon reading the following specification and inspecting the accompanying drawings.

BRIEF DESCRIPTION OF THE DRAWINGS

FIG. 3 is a broken, sectional view taken substantially along the irregular line III-III of FIG. 2.

FIG. 5 is an enlarged view of the assembled differential housing.

FIG. 6 is a sectional view of the differential gear mechanism taken along the line VI-VI of FIG. 5.

FIG. 7 is a sectional elevational view of a further modification, same being taken along the line VII-VII of FIG. 9.

Figure 1:
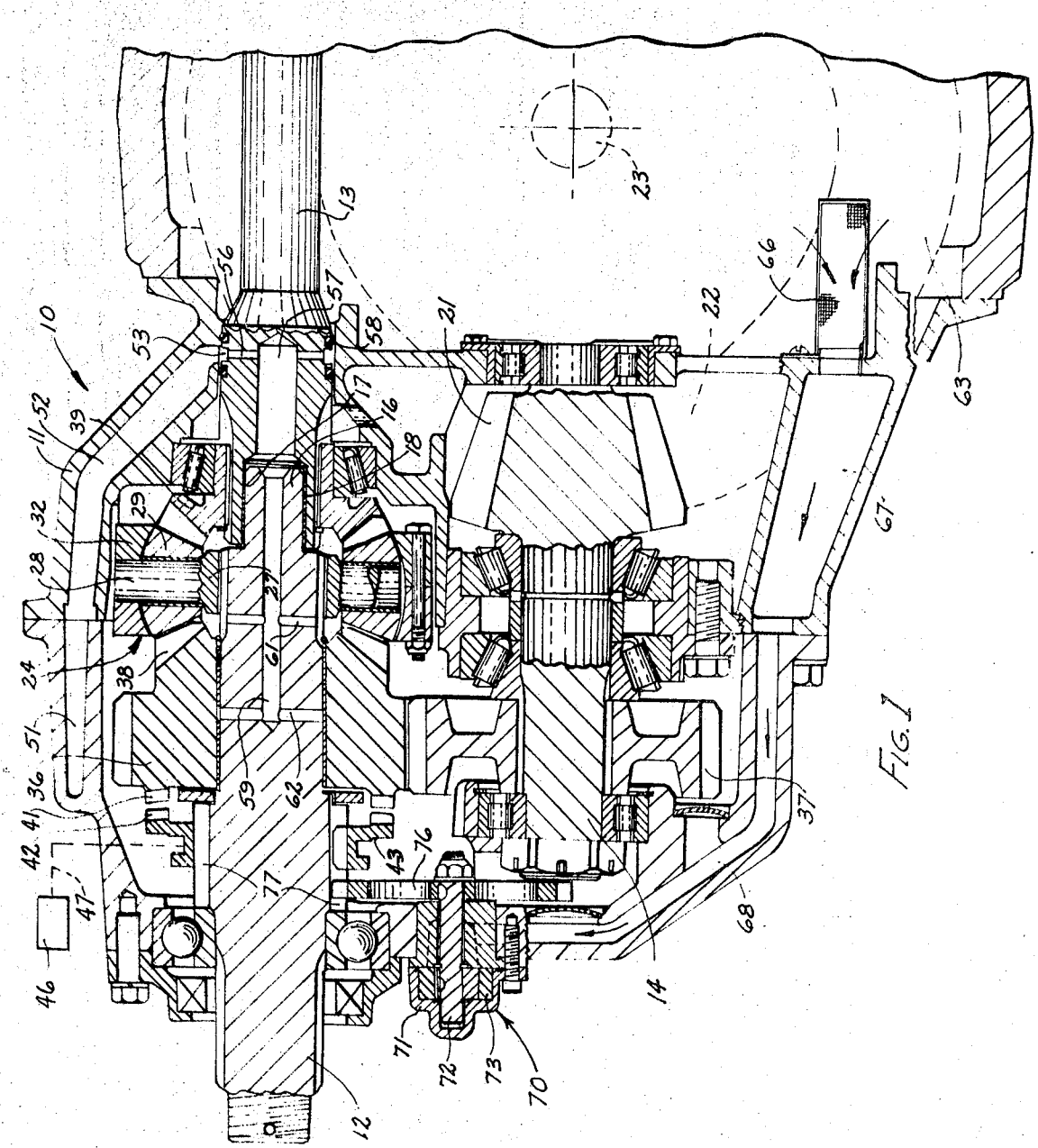
FIG. 1 is a broken, sectional elevational view of a geared drive mechanism, specifically an interaxle differential structure, including therein an improved lubrication system according to the present invention.
Figure 2:
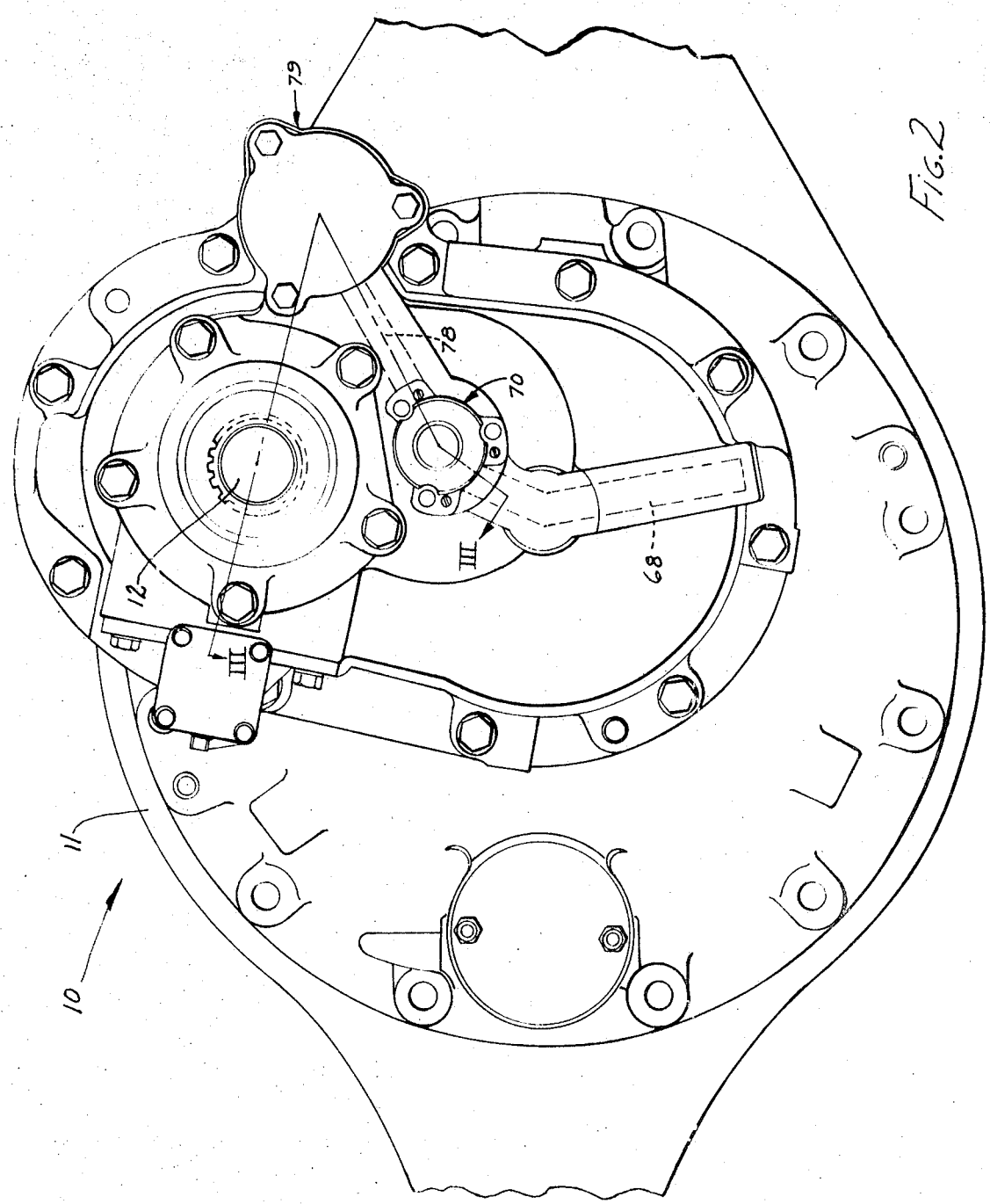
FIG. 2 is an elevational view taken substantially from the leftward end of FIG. 1.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer to directions with respect to the normal direction of movement of the vehicle in which the apparatus of the invention is installed. The words "inward" and "outward" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing, for a geared drive mechanism having a differential gear mechanism therein and particularly an interaxle differential structure for multiple axles, an annular differential housing having a plurality of openings formed in the periphery thereof, which openings are located between adjacent differential gears, and a pump which is positively driven, as by being rotatably interconnected to an input or output shaft. A first passageway supplies fluid from a reservoir to the pump, and a second passageway conducts pressurized fluid from the pump to a discharge nozzle located directly adjacent the annular differential housing. Rotation of the annular housing causes the openings therein to pass directly adjacent the discharge nozzle whereby lubricant ejected therefrom passes through the openings into contact with the differential gears and into contact with the differential spider. The lubricant then flows radially outwardly due to centrifugal force to lubricate the bearings for the differential gears. Other suitable passageways in communication with the discharge side of the pump are provided for positively supplying lubricant to other desired points within the mechanism.

DETAIL DESCRIPTION

FIG. 1 illustrates therein a geared drive mechanism 10 which, for purposes of illustration, comprises an interaxle differential structure which functions as a power divider for driving tandem axles. Such an interaxle differential structure and its relationship to tandem axles is illustrated and described in detail in U.S. Pat. No. 3,146,842. However, a brief description of the interaxle differential structure 10, hereinafter referred to as a power divider, will be given to facilitate an understanding of the lubrication system embodying the present invention.

The power divider 10 includes a housing 11 which rotatably supports therein an input shaft 12 which is drivingly connected to first and second output shafts 13 and 14 respectively. The input shaft 12 is coaxial with the output shaft 13 and includes a pilot portion 16 which is received within a pilot opening 17 formed within the end of the output shaft 13, a suitable bushing 18 being provided therebetween.

The second output shaft 14 is provided with a bevel drive pinion 21 fixedly secured thereto, which drive pinion 21 is in meshing engagement with an axle drive gear 22. Axle drive gear 22 is drivingly interconnected to an axle 23 by means of a conventional axle differential unit such as illustrated in U.S. Pat. No. 3,146,842. In a similar manner, the first output shaft 13 is drivingly interconnected to a further axle, also by means of a conventional axle differential gear mechanism. This structure is well known, being shown in U.S. Pat. No. 3,146,842, and thus does not constitute a portion of the present invention.

The power divider 10 includes therein a differential gear mechanism 24 which, as illustrated in FIG. 6, includes a conventional spider 26 having a hub or ring portion 27 splined to the input shaft 12. A plurality of circumferentially spaced pins 28 are fixedly secured to and extend radially outwardly from the ring portion 27. Each of the pins 28 rotatably supports a conventional bevel differential gear 29 thereon by means of a conventional bushing 31. An annular differential carrier or housing 32 surrounds the spider 27 and the differential gears 29, the differential housing being provided with openings 33 therein for supporting the outer ends of the pins 28. The differential gear mechanism 24 as described above is conventional and well known.

Rotatably mounted on the input shaft 12 adjacent the differential gear mechanism 24 is a gear member 36 (FIG. 1), which gear member 36 meshes with a driven gear 37 keyed to the second output shaft 14. The gear 36 has bevel teeth 38 at the rightward end thereof for engagement with the differential gears 29. The differential gears 29 are also engaged by bevel teeth on a driven gear 39 which is splined to the output shaft 13. The gear 36 also has clutch teeth 41 thereon which are engageable by the teeth 42 of a power divider lock-clutch member 43, which member is splined on input shaft 12 for axial movement with respect to said shaft 12 and for rotation therewith. The clutch member 43 is operated from a conventional actuating device, such as a power cylinder 46, which device acts through a conventional linkage 47.

When clutch teeth 41 and 42 are disengaged, as shown in FIG. 1, a differential relationship can exist in a known manner between the two output shafts 13 and 14 as same are driven through the differential gear mechanism 24 by means of the input shaft 12. However, when the clutch teeth 41 and 42 are engaged, then the gear 36 is locked to the input shaft 12 and the driven shafts 13 and 14 are driven at a fixed ratio with respect to each other, such ratio depending upon the relationship between the gears 36 and 37. The above-described gear structure is conventional and well known.

In order to lubricate the gearing provided within the power divider 10, the parts thereof are provided with a lubrication system including selected passageways therethrough. Specifically, the upper side of the housing 11 (FIG. 1) surrounding the differential gear mechanism 24 has a trough or passage 51 formed therein, one side of which extends tangentially of and adjacent the gear 36 in surrounding relationship thereto for receiving in a conventional manner oil thrown centrifugally thereinto by the gear 36. The trough 51 extends rearwardly and inwardly (or downwardly) to a passage 52 which extends through the wall of the housing 11 and is connected to an annular groove 53 in the circumference of the output shaft 13. A plurality of radial openings 56 communicate between the groove 53 and a central opening 57 within the output shaft 13. Axially spaced o-rings 58 prevent leakage of lubricating oil between the shaft 13 and the housing and insure that the lubricating oil from trough 51 will be transported to central opening 57 through the radial openings 56. The central opening 57 communicates with the pilot opening 17 in shaft 13 and with a central opening 59 within the input shaft 12. Input shaft 12 has a plurality of radial openings 61 extending from central opening 59 through the peripheral surface thereof to communicate with the space within the housing adjacent the left side of the differential gear mechanism 24 to direct the flow of oil to the gear teeth 38. Rotation of differential gears 29 with respect to the bevel gear 38 will provide for lubrication between the bevel gears 38 and 39 and the differential gears 29.

Thus, oil from a reservoir or sump 63 adjacent the bottom of the housing 11 is carried by the gear 37 upwardly to the gear 36 and then discharged centrifugally into the trough 51. From here the oil flows by gravity rearwardly and downwardly through the passage 52, the annular groove 53 and the radial openings 56 into the central opening 57 within output shaft 13. Thereafter, the oil travels leftwardly along the bushing 18 between the shafts 12 and 13 and also moves along the central opening 59 and then outwardly through the radial openings 61 and 62 to the differential gear mechanism 24 and the bushing 35 for the gear 36, respectively.

The above-described splash lubrication system thus provides for the supply of lubricant to specific points within the power divider 10, which specific points include the different gear mechanism 24, the pilot bushing 18 and the bushing 35. However, in a splash lubrication system, the amount of lubricant supplied varies according to the speed of rotation of the individual gear members and likewise is dependent upon the geometric configuration of the power divider, such as the relative elevation or spacing between the individual elements and the presence or absence of surrounding walls and supporting webs. Accordingly, to provide an adequate supply of lubricant to the above areas under all operating conditions, specifically under high-speed operating conditions, the power divider 10 is additionally provided with a positive pressure lubrication system to insure an adequate supply of lubricant to the desired areas.

The positive pressure lubrication system is illustrated in FIGS. 1—4 and includes a strainer 66 (FIG. 1) located within the oil sump 63 formed in the bottom of the housing 11. The strainer 66 provides for communication and flow of oil into a first passage 67 formed within the housing 11, which passage 67 in turn communicates with a further passage 68 also formed within the housing 11. Passage 68 is in communication with the inlet port 69 (FIG. 3) of a conventional rotor-type pump 70. The pump 70 includes a pump housing 71 fixedly secured to the housing 11 and a driving shaft 72 having a conventional pump rotor 73 mounted thereon. The driving shaft 72 further has a drive gear 76 nonrotatably secured thereto, which drive gear 76 is positioned within the housing 11 and is in meshing and driving engagement with the teeth 77 formed on the input shaft 12.

Figure 4:
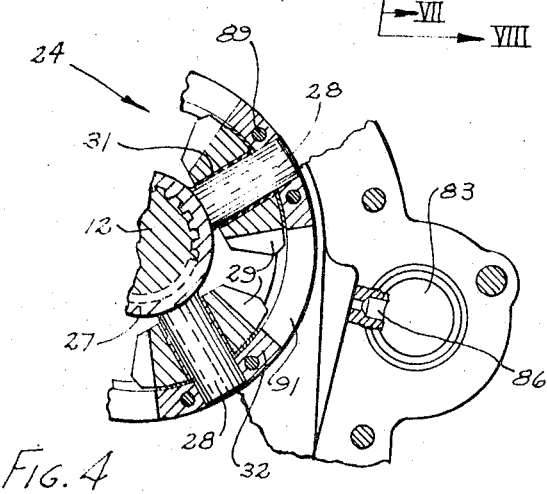
FIG. 4 is a broken, sectional view taken along the line IV-IV of FIG. 3, the differential housing being angularly displaced for purposes of illustration.

Positive rotation of the pump causes the oil supplied thereto from the passage 68 to be pressurized and then discharged into the outlet port 74 (FIG. 3), whereupon the oil then flows through a further passage 78 formed within the housing 11, which passage 78 communicates with the cylindrical bore 81 of a filter unit 79. The filter unit 79 includes a conventional cylindrical filter 82 positioned within the bore 81 whereby oil supplied to the bore 81 will flow inwardly through the peripheral walls of the filter 82 with the filtered oil then being discharged through the axial end (rightward end in FIG. 3) of the filter into a chamber 83. Chamber 83 communicates with a discharge orifice or nozzle 86, which nozzle 86 is positioned closely adjacent to and substantially radially aligned with the differential gear mechanism 24 (FIG. 4).

The differential mechanism 24 is provided with an annular carrier 32 which, as illustrated in FIGS. 5 and 6, consists of a pair of annular members 87 and 88 which are mirror images of one another and are fixedly connected together by means of bolts 89 when the differential mechanism 24 is assembled. Each of the annular members 87 and 88 is provided with recess portions 92 formed in the adjacent abutting faces thereof, which recess portions define a plurality of circumferentially spaced, elongated rectangular windows or openings 91 when the differential carrier 32 is assembled as shown in FIG. 5. The windows 91 are circumferentially spaced between the adjacent pins 28. The parts are so positioned that as the differential carrier rotates, the windows 91 will move past the discharge nozzle 86 (FIG. 4) whereby oil ejected from the nozzle will pass through the openings 91 so as to contact the teeth of an adjacent pair of differential gears 29. Some of the lubricant will also come into contact with the external periphery of the ring 27, which lubricant will then flow, due to centrifugal force, outwardly along the pins 28 to provide for lubrication of the bushings 31.

OPERATION

The operation of the device embodying the invention will be described in detail hereinbelow for a better understanding thereof.

When the clutch member 43 is in the disengaged position shown in FIG. 1, rotation of input shaft 12 will cause rotation of the spider 26 of the differential mechanism 24. Differential mechanism 24 will cause rotation of the side bevel gears 38 and 39 whereby the output shafts 13 and 14 will likewise be driven. Output shafts 13 and 14 will then drive individual axles through a further conventional differential gear mechanism. On the other hand, when the clutch member 43 is shifted to engage the teeth 41, the gear 36 and the differential gear mechanism 24 are effectively locked together as a unit for simultaneous rotation with the input shaft 12. Under either of the above operational conditions, the spider 26 (FIG. 6) and the differential carrier 32 are caused to rotate with the input shaft 12, whereby the windows 91 formed therein sequentially move past the discharge nozzle 86.

Rotation of input shaft 12 also causes rotation of the pump shaft 72 since same is drivingly connected to the input shaft by means of gear 76. Thus, oil is supplied from the sump 63 through the passages 67 and 68 to the pump inlet port 69, which oil is then pressurized and discharged into the passage 78 and supplied to the filter unit 79. The oil then passes through the filter 82 and is supplied from the interior thereof to the chamber 83, whereupon the pressurized oil is discharged through the nozzle 86 into contact with the differential gear mechanism 24. The rotation of the annular differential carrier 32 past the nozzle 86 causes the oil discharged therefrom to be sprayed through the elongated windows 91, whereby some of the oil comes into contact with the teeth formed on the differential gears 29, which oil is then transferred to the respective side bevel gears 38 and 39 due to the meshing engagement therewith. Some of the oil sprayed through the window 29 also comes into contact with the spider ring 27 and, due to the rotation thereof, the oil thereon is moved outwardly due to centrifugal force along the radial pins 28 to provide for the desired lubrication of the bushings 31 which rotatably support the differential gears 29.

Since the pump shaft 72 is drivingly connected to the input shaft 12, the quantity and/or pressure of the lubricant delivered from the pump 70 will vary substantially in proportion to the speed of rotation of the input shaft 12. This thus results in greater quantities of lubricant being supplied to the differential gear mechanism at higher speeds. Since the differential requires greater lubrication at high speeds than it does at low speeds, the pump 70 and its driving relationship to the input shaft thus provides a compensating lubrication system which supplies a quantity of lubricant which is substantially proportional to the need.

MODIFICATION

Figure 9:
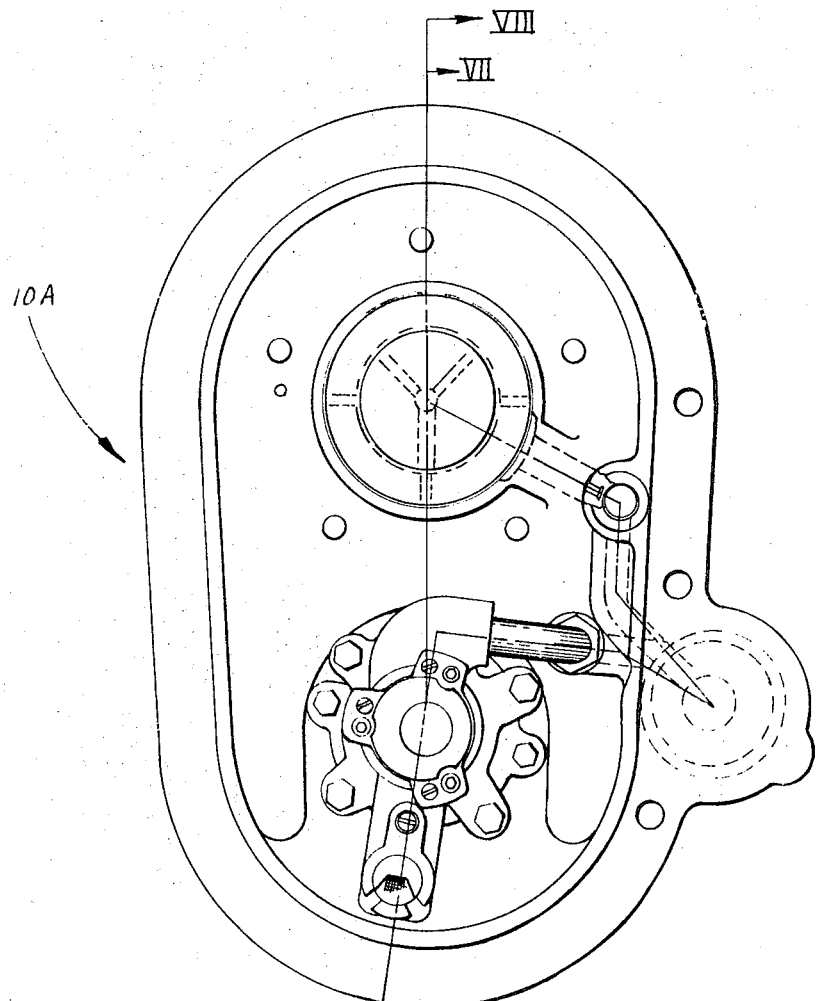
FIG. 9 is an elevational view, partially in section, taken along the line IX-IX of FIG. 7.
Figure 8:
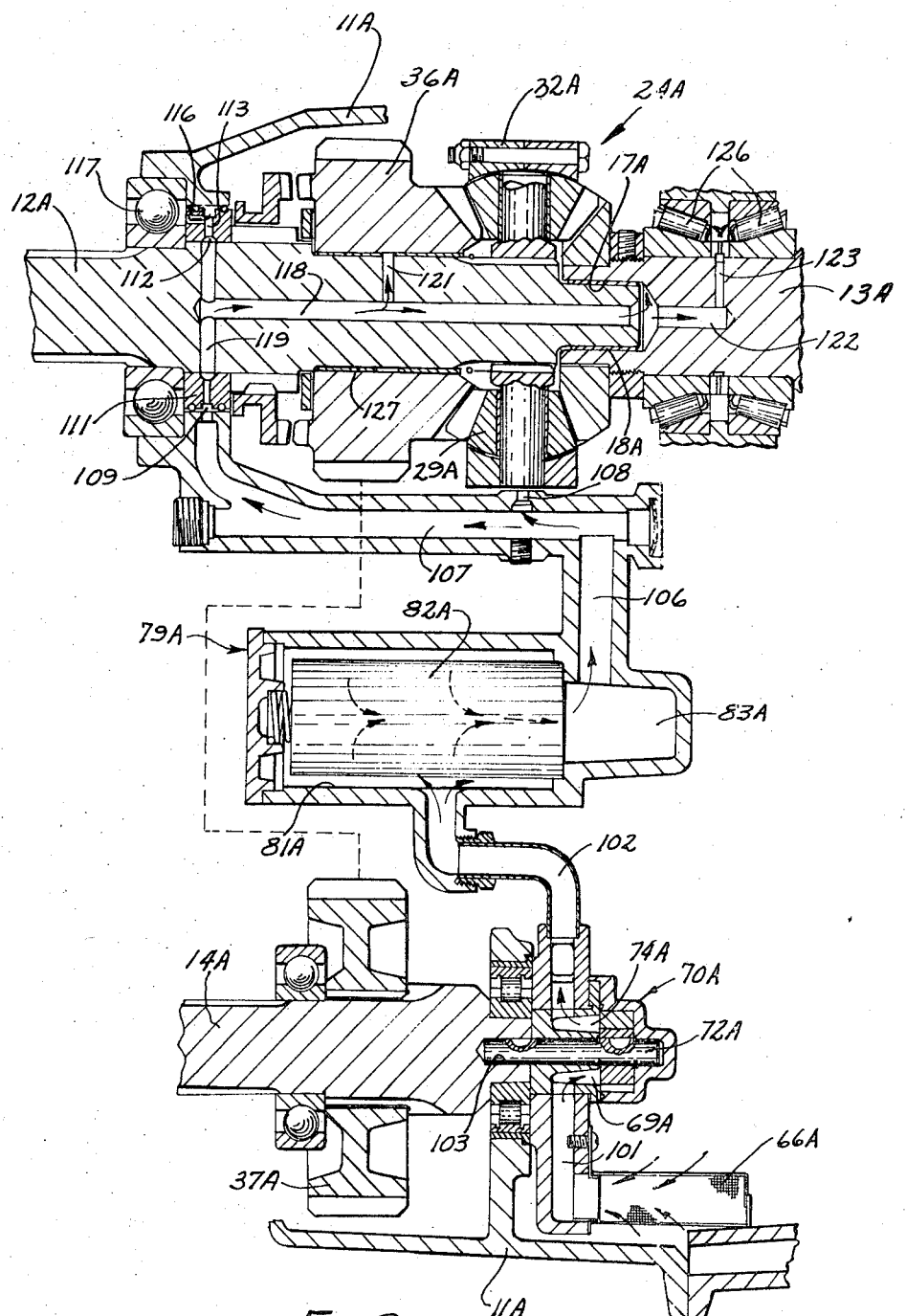
FIG. 8 is an expanded, broken, sectional view taken along the irregular line VIII-VIII of FIG. 9.

FIGS. 7—9 illustrate therein a modification of the present invention. However, due to the overall similarity between the embodiment of FIGS. 7—9 with the above described embodiment of FIGS. 1—6, parts of the embodiment of FIGS. 7—9 will be referred to by the same reference numerals used to designate the corresponding parts of the embodiment of FIGS. 1—6 but with the suffix "A" added thereto.

The power divider 10A illustrated in FIG. 7 again comprises an interaxle differential structure utilized for driving a four-wheel drive vehicle. The power divider 10A has a housing 11A having an input shaft 12A rotatably supported therein and drivingly interconnected to output shafts 13A and 14A. Output shaft 13A is interconnected through a conventional differential gear mechanism to a rear axle, whereas output shaft 14A is drivingly connected through a conventional differential gear mechanism to a front axle. Input shaft 12A again rotatably supports a gear 36A thereon, which gear meshes with and drives a further gear 37A nonrotatably secured to the output shaft 14A. Gear 36A is clutchably engaged with the input shaft 12A by the clutch member 43A or, alternatively, gear 36A is driven from the differential gear mechanism 24A, which differential gear mechanism 24A also drives the bevel gear 39A fixedly secured to the output shaft 13A. This structure is thus the same as the interaxle differential structure illustrated in FIG. 1.

Considering now the positive pressure lubrication system (FIG. 8) provided within the power divider 10A, same includes a conventional rotor pump 70A, the drive shaft 72A of which extends into a central opening 103 formed within the end of the output shaft 14A, the rotor shaft 72A being nonrotatably secured to the drive shaft 14A by a suitable key. Pump 70A is provided with an inlet port 69A which is in communication with a passage 101 formed within the housing 11A, which passage 101 opens into a sump or reservoir 63A formed within the bottom of the housing 11A. A strainer 66A is provided at the inlet end of the passage 101.

Pump 70A is further provided with an outlet port 74A which communicates with a further passage 102 formed within the housing 11A, which passage in turn communicates with the bore 81A of the filter unit 79A. The filter unit 79A again includes therein a conventional cylindrical filter member 82A whereby oil supplied to the bore 81A passes through the peripheral wall of the filter 82A into the internal portion thereof whereby the filtered oil flows axially into a chamber 83A. Chamber 83A in turn communicates with a passage 106 which connects to a further passage 107. The passage 107 communicates with a discharge nozzle 108 which is positioned adjacent to and is directed radially toward the annular carrier 32A of the differential gear mechanism 24A. The differential gear mechanism 24A again includes a plurality of circumferentially spaced windows formed in the circumferential periphery thereof as illustrated in FIGS. 4—6 whereby oil discharged from nozzle 108 will flow through the windows to provide for lubrication of the differential gear mechanism in the same manner as explained above.

Passage 107 further communicates with an external annular groove 109 formed within a ring member 111 which rotatably surrounds the input shaft 12A. Annular groove 109 communicates with a further internal annular groove 112 by a plurality of radial openings 113, which radial openings 113 also communicate with an axial opening 116 to provide for flow of lubricant to the bearing 117 which rotatably supports the input shaft 12A within the housing 11A.

The annular groove 112 further communicates with a plurality of radial openings 119 formed within the input shaft 12A, which openings 119 communicate with a central passage 118 which extends axially to the end of the input shaft to provide for flow of lubricant into the pilot opening 17A, thereby providing for lubrication of the bushing 18A. A further central opening 122 is formed within the end of output shaft 13A. Central opening 122 communicates with the pilot opening 17A and is provided with a radial opening 123 at its innermost end for providing for flow of lubricant to the roller bearing 126 which rotatably supports the output shaft 13A within the housing 11A. A further radial opening 121 is formed in the input shaft 12A, which opening 121 provides for communication between the central opening 118 and the bushing 127 positioned between the gear 36A and the input shaft 12A for providing for lubrication thereof.

The operation of the lubrication system illustrated in FIGS. 7—9 is substantially indentical to the operation of the lubrication system of FIG. 1—6 as explained in detail above. That is, the pump 70A is connected to one of the output shafts for rotation therewith whereby fluid is positively pressurized and positively supplied to the differential gear mechanism 24A, which differential gear mechanism is provided with windows in the annular carrier for permitting adequate lubrication of the differential gears and the support bushings. The embodiment illustrated in FIGS. 7—9 has further lubrication passageways connected to the discharge side of the pump to provide for flow of pressurized lubricant to other critical lubrication areas, such as the shaft support bearings 117 and 126 and the bushings 18A and 127. This modification of the invention thus provides for positive lubrication of not only the differential gear mechanism, but also of all critical bearing and friction points, especially under high speed operating conditions.

While the invention has been described with specific reference to an interaxle differential structure, it will be apparent that the positive pressure lubrication system described above will be equally applicable to any geared drive mechanism incorporating a differential gear mechanism therein.

I claim:

1. A lubricated geared drive system, comprising:
a housing, a first shaft and means rotatably supporting same for rotation relative to said housing, a second shaft and means rotatably supporting same for rotation relative to said housing;
gear means including a differential gear mechanism drivingly interconnected between said first and second shafts, said differential gear mechanism including an annular carrier member and a spider member positioned within and nonrotatably interconnected to the annular carrier member, the spider member having a hub portion supported on one of said shafts and further having radially extending arms connected to the annular carrier member;
said differential gear mechanism further including a differential gear rotatably supported upon each of said arms within an annular space between said hub portion and said annular carrier member, and said annular carrier member having an opening therethrough; and
lubrication means for supplying pressurized lubricant to said differential gear mechanism, said lubrication means including a lubricant reservoir and pump means for positively pressurizing lubricant, a lubricant discharge nozzle located substantially adjacent said differential gear mechanism for permitting lubricant to be sprayed through said opening in said annular carrier member, and passageway means interconnecting said discharge nozzle to said pump means for providing flow of lubricant from said pump means to said nozzle for permitting positive lubrication of the differential gear mechanism.

2. A system according to claim 1, wherein said annular carrier member includes a plurality of circumferentially spaced openings extending radially through a peripheral wall thereof, said discharge nozzle being positioned substantially adjacent the peripheral wall of said carrier member and being substantially radially inwardly directed for spraying lubricant through said openings.

3. A system according to claim 2, wherein said pump means includes a rotary pumping member and means drivingly connecting said rotary pumping member to one of said shafts.

4. A system according to claim 1, further including bearing means mounted on said housing for rotatably supporting one of said shafts thereon, and said lubrication means including passage means communicating between said bearing means and said pump means for positively supplying lubricant to said bearing means.

5. A system according to claim 1, wherein said lubrication means includes first conduit means connected between said reservoir and the inlet port to said pump means and second conduit means connected between the outlet port of said pump means and said discharge nozzle, and lubricant filter means including a filter member disposed in the flow path defined by said first and second conduit means for causing said lubricant to flow through said filter member.

6. A geared drive apparatus, comprising:
housing means having a lubricant reservoir therein;
an input shaft having a portion thereof positioned within said housing means;
first and second output shafts each having a portion thereof positioned within said housing means;
first bearing means rotatably supporting said input and said output shafts relative to said housing means;
gear means drivingly connecting said input shaft to said first and second output shafts, said gear means including a differential gear mechanism, said differential gear mechanism including a support member nonrotatably secured to one of said shafts and a plurality of differential gears and second bearing means rotatably supporting said differential gears on said support member, a first side gear in mesh with said differential gears and drivingly connected to a second one of said shafts, a second side gear in mesh with said differential gears and drivingly connected to a third one of said shafts; and
lubrication means including pump means for positively supplying pressurized lubricant from said reservoir to said gear means, said lubrication means including a discharge nozzle positioned adjacent said differential gear mechanism and conduit means connecting said discharge nozzle to said pump means for providing for positive lubrication of said differential gear mechanism, said nozzle causing lubricant to be sprayed onto said differential gears and onto said support member for causing lubrication of said second bearing means.

7. An apparatus according to claim 6, further including means drivingly connecting said pump means to one of said shafts.

8. An apparatus according to claim 6, wherein said differential gear mechanism includes an annular carrier member positioned in surrounding relationship to said support member and said differential gears, said carrier member having a plurality of openings extending therethrough for permitting said discharge nozzle to spray lubricant through said openings onto said differential gears and onto said support member.

9. An apparatus according to claim 8, wherein said support member includes a hub portion nonrotatably secured to said one shaft and a plurality of arms extending radially outwardly from said hub portion into engagement with said annular carrier member, said differential gears being rotatably supported on said arms and disposed within an annular space defined between said annular carrier member and said hub portion, said annular carrier member having a plurality of circumferentially spaced openings extending radially through the circumferential wall thereof with said openings being positioned between the adjacent arms of said support member.

10. A lubricated differential gear mechanism, comprising rotatable support means, differential gear means rotatably supported on said support means, said support means including an annular housing member surrounding said differential gear means with said annular housing member including opening means extending therethrough, and means for lubricating said gear means, said lubricating means including a discharge nozzle positioned closely adjacent the path of movement of said opening means for spraying lubricant through said opening means for lubricating said differential gear means.

11. A gear mechanism according to claim 10, wherein said opening means includes a plurality of circumferentially spaced openings extending radially outwardly through said annular housing member, and wherein said discharge nozzle is positioned to direct a spray of lubricant radially inwardly through said openings into contact with said differential gear means.

12. A gear mechanism according to claim 10, wherein said support means includes a spider member having a central hub and a plurality of arms extending radially outwardly from said hub, and bearing means rotatably supporting said differential gear means on said arms, said discharge nozzle causing lubricant to be sprayed onto the inner ends of said arms whereby lubricant flows radially outwardly along said arms to lubricate said bearing means.

13. A gear mechanism according to claim 12, wherein said opening means includes a plurality of circumferentially spaced openings extending radially outwardly through said housing member and disposed between said arms, whereby said discharge nozzle causes lubricant to be sprayed radially inwardly through said openings to lubricate said differential gear means and said bearing means.

14. A gear mechanism according to claim 10, further including pump means for positively supplying quantities of pressurized lubricant to said discharge nozzle.

15. A gear mechanism according to claim 14, further including an input shaft and an output shaft drivingly connected to said differential gear means, and said pump means including a rotary pumping member and means drivingly connecting said rotary pumping member to one of said shafts for rotation therewith.

16. A gear mechanism according to claim 13, wherein said housing member comprises a shell-like member disposed in concentric and surrounding relationship to said central hub, the radially outer ends of said arms being connected to said housing member.

17. A gear mechanism according to claim 10, wherein said annular housing member comprises a pair of ringlike members having axial surfaces disposed in abutting engagement with one another and fixedly connected together, at least one of said axial surfaces having a recess therein which extends radially through the respective ringlike member for defining said opening means when said two ringlike members are assembled together.

18. In an axial mechanism comprising a housing containing a gear chamber and a lubricant reservoir, a pair of output shafts extending into said housing and supported for rotation relative thereto, an input shaft extending into said housing and supported for rotation relative thereto, said input shaft and said pair of output shafts all being substantially parallel, a differential gear unit coacting with said shafts for transmitting torque from said input shaft to said pair of output shafts, said differential gear unit including a plurality of rotatable components and specifically including a rotatable support means having a first gear rotatably supported thereon and in meshing engagement with a second gear, and lubrication means including pump means for positively pressurizing and supplying lubricant from said reservoir to said differential gear unit, said lubrication means including discharge nozzle means positioned closely adjacent said differential gear unit for causing the lubricant to be sprayed directly onto one of said support means and gears.

19. A geared apparatus according to claim 18, wherein said pump means includes a positively driven pump member and means drivingly interconnecting said pump member to one of said shafts, said lubrication means including first passageway means interconnecting said lubricant reservoir to the input side of said pump means and second passageway means connecting the discharge side of said pump means to said discharge nozzle, said discharge nozzle being positioned for causing said lubricant to be sprayed directly onto said rotatable support means, whereby said lubricant flows outwardly of said support means due to centrifugal force so as to lubricate the bearing between said first gear and said support means.

20. A geared apparatus according to claim 19, wherein said nozzle also causes lubricant to be sprayed directly onto the teeth of said first gear.

21. A lubricated differential gear mechanism for drivingly interconnecting a pair of rotatable members, comprising a differential gear unit for drivingly interconnecting said pair of rotatable members for permitting transfer of torque therebetween, said differential unit including rotatable support means drivingly interconnected to one of said rotatable members, said support means including a support portion extending substantially radially relative to the rotational axis of said support means, a first rotatable gear drivingly interconnected to the other rotatable member, a second rotatable gear rotatably mounted on said support portion and disposed in meshing engagement with said first gear, bearing means disposed between said support portion and said second rotatable gear, and lubrication means including pump means for positively supplying lubricant to said differential gear unit, said lubrication means including a discharge nozzle disposed closely adjacent said differential gear unit and directed toward said rotatable support means for spraying lubricant directly onto said support means adjacent the radially inner end of said support portion whereby said lubricant then flows radially outwardly of said support portion due to centrifugal force for lubricating said bearing means.

22. A mechanism according to claim 21, wherein said discharge nozzle is directed to also cause lubricant to be sprayed directly onto the teeth of one of said gears.